US012283906B2

(12) United States Patent
Morihashi et al.

(10) Patent No.: US 12,283,906 B2
(45) Date of Patent: Apr. 22, 2025

(54) MOTOR CONTROL DEVICE

(71) Applicant: FANUC CORPORATION, Yamanashi (JP)

(72) Inventors: Ryou Morihashi, Yamanashi (JP); Satoshi Ikai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 120 days.

(21) Appl. No.: 18/272,212

(22) PCT Filed: Feb. 3, 2022

(86) PCT No.: PCT/JP2022/004309
§ 371 (c)(1),
(2) Date: Jul. 13, 2023

(87) PCT Pub. No.: WO2022/172859
PCT Pub. Date: Aug. 18, 2022

(65) Prior Publication Data
US 2024/0088820 A1 Mar. 14, 2024

(30) Foreign Application Priority Data
Feb. 10, 2021 (JP) .................. 2021-020144

(51) Int. Cl.
G05B 19/4155 (2006.01)
H02P 6/16 (2016.01)
(Continued)

(52) U.S. Cl.
CPC .............. H02P 29/028 (2013.01); H02P 6/16 (2013.01); H02P 29/032 (2016.02)

(58) Field of Classification Search
CPC ..... G05B 19/4155; H02P 6/12; H02P 29/028; H02P 29/032; H02P 6/16
See application file for complete search history.

(56) References Cited

U.S. PATENT DOCUMENTS

2019/0258229 A1* 8/2019 Oho .................. G05B 19/4155
2020/0412284 A1* 12/2020 Aoyagi ..................... H02P 6/12

FOREIGN PATENT DOCUMENTS

JP     60-154110    8/1985
JP     10-277887    10/1998
(Continued)

OTHER PUBLICATIONS

International Search Report issued May 10, 2022 in International (PCT) Application No. PCT/JP2022/004309.

Primary Examiner — Cortez M Cook
(74) Attorney, Agent, or Firm — Wenderoth, Lind & Ponack, L.L.P.

(57) ABSTRACT

The present invention addresses the problem of, when an abnormality has occurred in one detector, switching to feedback control based on a detector in which an abnormality has not occurred. This motor control device 100 is provided with a first abnormality detection unit 115 that detects an abnormality in a separate detector 154 as the detector or a feedback cable 1541 thereof, a second abnormality detection unit 116 that detects an abnormality in an encoder 151 of a motor as the detector or a feedback cable 1511 thereof, and a switching unit 111 that switches from full-closed control to semi-closed control, or to control using only the separate detector. When either of the first abnormality detection unit 115 or the second abnormality detection unit 116 has detected an abnormality, the switching unit 111 switches to control using only any detector in which an abnormality has not occurred.

5 Claims, 8 Drawing Sheets

(51) Int. Cl.
*H02P 29/028* (2016.01)
*H02P 29/032* (2016.01)

(56) References Cited

FOREIGN PATENT DOCUMENTS

| | | |
|---|---|---|
| JP | 2007-272720 | 10/2007 |
| JP | 2010-271854 | 12/2010 |
| JP | 2018-207695 | 12/2018 |
| JP | 2020-95492 | 6/2020 |

* cited by examiner

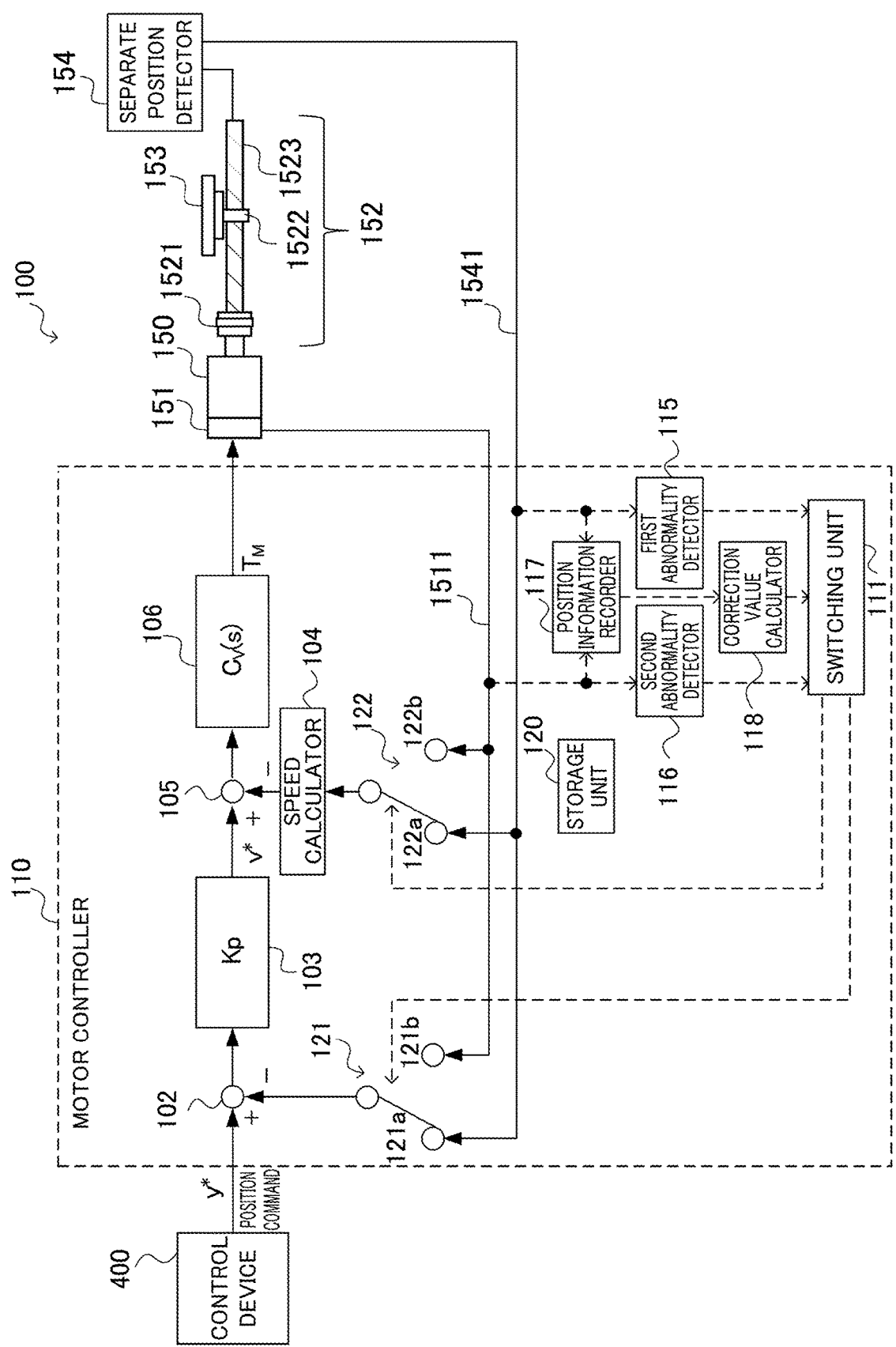

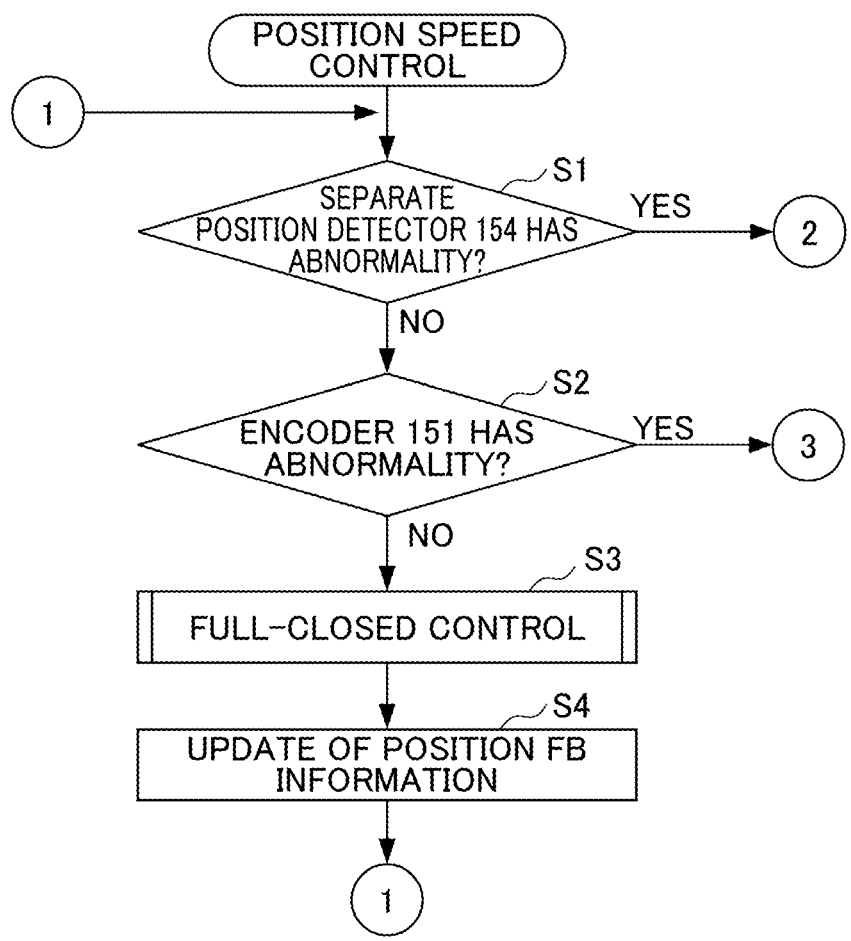

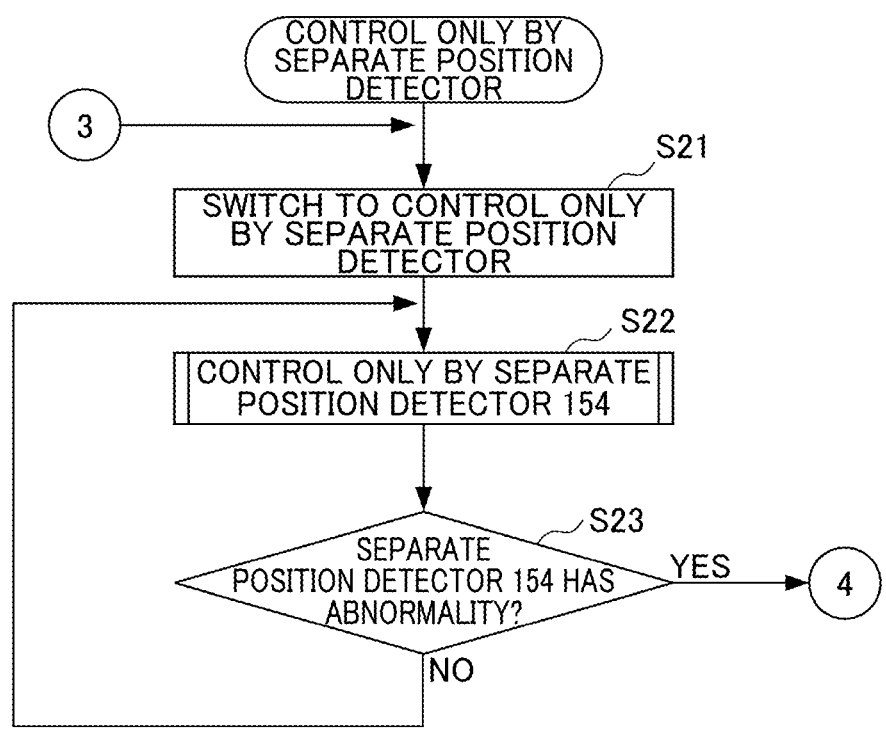

MOTOR CONTROL DEVICE

TECHNICAL FIELD

The present invention relates to a motor control device.

BACKGROUND ART

In machines such as a machine tool, industrial machine, and industrial robot, in the case of controlling the position and speed of a machine mobile part driven using an electric motor such as a servomotor, loop control of the position is performed using a position detector and speed detector, and a speed loop is provided within this position loop to perform feedback control of the position speed. As feedback control of such position/speed, for example, semi-closed loop control (hereinafter also referred to as "semi-closed control"), and full-closed loop control (hereinafter also referred to as "full-closed control") are exemplified. In the semi-closed control, the position and speed are detected by a detector such as a rotary encoder (hereinafter also referred to as "encoder"), during feedback control of position speed. Alternatively, a system has been used which, upon feedback control of position/speed in full-closed loop control, detects based on the speed of an electric motor driving the machine mobile part, and detects the position of the machine mobile part by a position detector such as a scale for position (hereinafter also referred to as "separate position detector"). It should be noted that feedback control by only the separate position detector detecting both the position and speed by the separate position detector (hereinafter also referred to as "control by only separate position detector") can also be exemplified as one feedback control example.

Patent Document 1 describes a control system 100 which, in the case of an interface of a servo amplifier 2 not handling connection with a machine end detector that detects the position of a drive mechanism, can contact this machine end detector to a controller 1, and operate by switching between a control system which semi-closed controls the drive mechanism and a control system which full-closed controls the drive mechanism by way of a switching switch 12 in the controller 1. It should be noted that the control system 100 described in Patent Document 1 is premised on, in the case of machine processing the drive mechanism by semi-closed control, switching the switching switch 12 to a side of SC (semi-closed control) in advance, and in the case of full-closed controlling the drive mechanism, switching the switching switch 12 to the side of FC (full-closed control) in advance. Patent Document 1 is not a configuration performing switching to semi-closed control in the case of abnormality arising in the machine end detector or the feedback cable thereof, or switching to control only by the machine end detector in the case of abnormality arising in the motor end detector or the feedback cable thereof during full-closed control. In this regard, Patent Document 2 discloses a motor control method during detector abnormality for reducing the damage of the machine and other objects. Patent Document 2 merely discloses technology for switching to speed control when it is no longer possible for a position detector 10 such as a scale, for example, to detect position correctly, and stopping a machine mobile part by performing low-speed control with "0" as the speed command, for example. The invention disclosed in Patent Document 2 is not a configuration which switches to semi-closed control, for example, in the case of abnormality arising in the position detector 10 such as a scale or the feedback cable thereof during full-closed control, or performs switching to control only by the position detector 10 such as a scale, for example, in the case of abnormality arising in a detector such as an encoder or the feedback cable thereof during full-closed control.

Patent Document 1: Japanese Unexamined Patent Application, Publication No. 2020-095492
Patent Document 2: Japanese Unexamined Patent Application, Publication No. H10-277887

DISCLOSURE OF THE INVENTION

Problems to be Solved by the Invention

In the case that abnormality arises in the separate position detector or in the feedback cable thereof during full-closed control, when switching to semi-closed control or abnormality arises in a detector such as an encoder or the feedback cable thereof during full-closed control, for example, a control device has been desired which can switch to feedback control based on a detector in which abnormality has not arisen, by performing switching to control by only the separate position detector, for example.

An object of the present invention is to provide a control device which, in the case of abnormality in one detector arising, can switch to feedback control based on a detector in which abnormality has not arisen.

Means for Solving the Problems

A motor control device according to a first aspect of the present invention is a motor control device for controlling a motor of a machine tool, robot or industrial machine, the motor control device including a motor controller, in which the motor controller includes:
a first abnormality detector which detects abnormality in a separate position detector serving as a detector, or a feedback cable connected to the separate position detector;
a second abnormality detector which detects abnormality in a rotary encoder of a motor serving as a detector, or a feedback cable connected to the rotary encoder; and
a switching unit which switches from full-closed control to semi-closed control or control only by the separate position detector, and
the switching unit, when detecting abnormality in any of the first abnormality detector or the second abnormality detector, switches to control which uses only either of the detectors for which abnormality is not detected.

Effects of the Invention

According to an aspect of the present invention, it is possible to provide a control device which, in the case of abnormality in one detector arising, can switch to feedback control based on a detector in which abnormality has not arisen.

BRIEF DESCRIPTION OF THE DRAWINGS

FIG. 4 is a view showing an outline in the case of the motor control device according to the present embodiment performing control by only a separate position detector;

FIG. 5A is a flowchart for explaining a flow of processing executed by the motor control device according to the present embodiment every position/speed loop processing cycle;

FIG. 5C is a flowchart for explaining a flow of processing executed by the motor control device according to the present embodiment every position/speed loop processing cycle.

PREFERRED MODE FOR CARRYING OUT THE INVENTION

Figure 1:
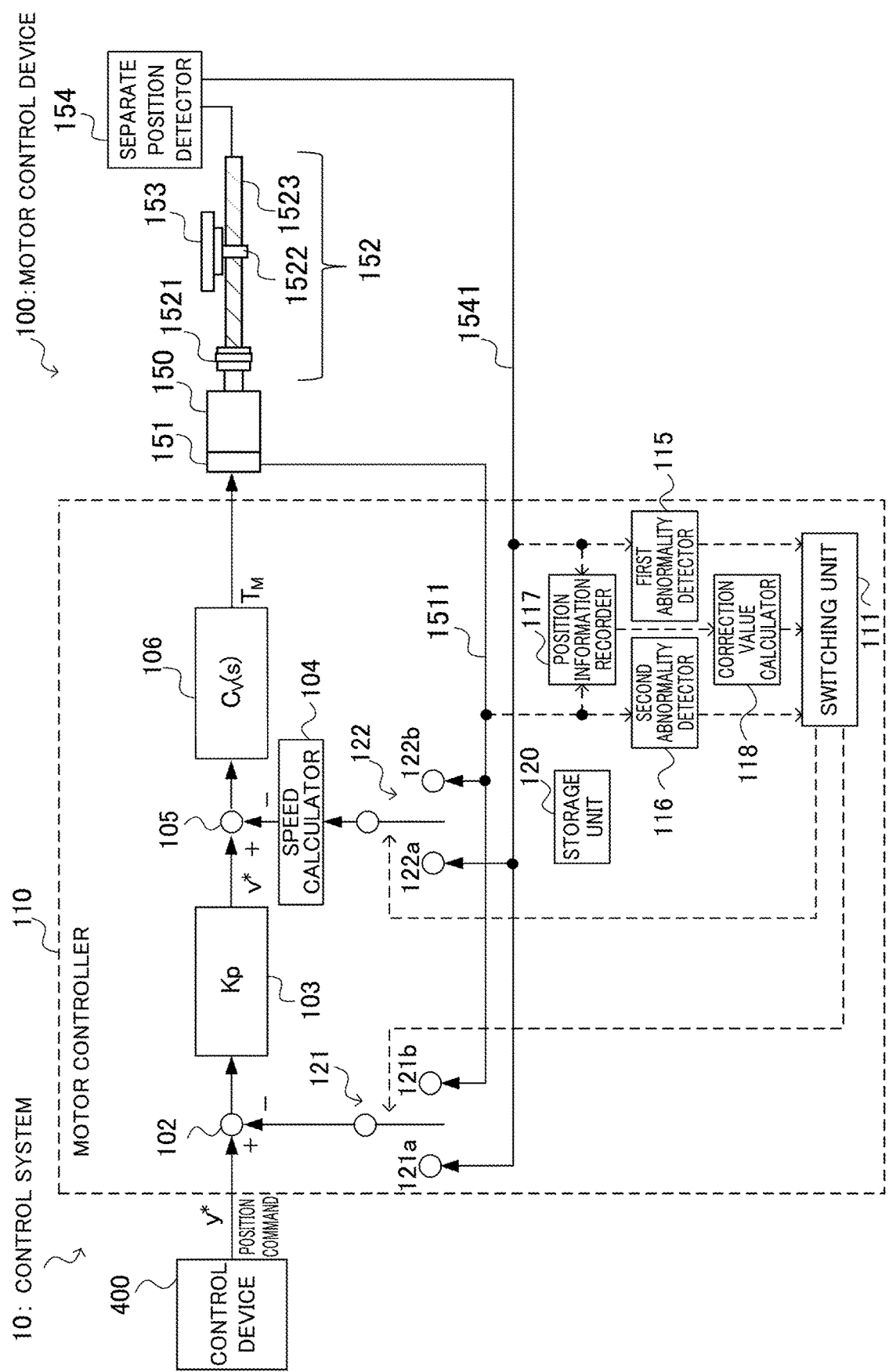
FIG. 1 is a schematic diagram showing the system configuration of a motor control device according to the present embodiment.

Hereinafter, an embodiment of the present invention will be explained by referencing the drawings. FIG. 1 is a schematic diagram showing a system configuration of a motor control device according to the present embodiment. First, a motor control device according to Example 1 of the present invention will be explained using the drawings. FIG. 1 is a schematic diagram of a control system 10 according to Example 1 of the present invention. The control system 10 according to Example 1 of the present invention includes a control device 400, a motor control device 100, a motor 150, a connection mechanism 152 and a table 153. Herein, the control device 400, for example, is a high-order control device such as a numerical control device which controls a machine tool or the like, or a robot control device which controls a robot. The motor control device 100 is connected to the control device 400. It should be noted that, in the present example, the motor control device 100 shall include the motor controller 110, motor 150, connection mechanism 152 and table 153.

The motor 150 is included in a machine tool, robot, industrial machine or the like, for example, serving as the control target of the motor controller 110. The motor controller 110 may be provided as part of the machine tool, robot, industrial machine or the like, together with the motor 150. For example, in the machine tool, in the case of the table mounting the workpiece (work) being moved in the X-axis direction and Y-axis direction, the motor controller 110 and motor 150 shown in FIG. 1 are respectively provided in the X-axis direction and Y-axis direction. In the case of moving the table in the directions or three or more axes, the motor controller 110 and motor 150 are provided in each of the axis directions.

The motor controller 110, for example, machines the workpiece (work) mounted on the table 153, by moving the table 153 via the connection mechanism 152 by the motor 150. The connection mechanism 152 has a coupling 1521 coupled to the motor 150, and a ball screw 1523 fixed to the coupling 1521, and a nut 1522 is threaded to the ball screw 1523. By rotational driving of the motor 150, the nut 1522 threaded to the ball screw 1523 moves in the axis direction of the ball screw 1523. The table 153 moves by movement of the nut 1522.

The rotation angle position of the motor 150 is detected by the rotary encoder 151 (hereinafter referred to as "encoder 151") provided to the motor 150, and the detected rotational position (rotation amount) is used as position feedback (position FB) in semi-closed control. Herein, since the rotation angle position of the motor 150 and the position of the table 153 are in a corresponding relationship, the rotational position detected by the encoder 151, i.e. position FB value, indicate the position of the table 153. It should be noted that, in the case of establishing the signal detected by the encoder 151 as position feedback (position FB) information, since a connection mechanism 152 such as the ball screw 1523, coupling 1521 and nut 1522 exists between the motor 150 and table 153, error due to backlash of gears in the connection mechanism 152, pitch error of the ball screw, and twist, stretch and thermal expansion of the ball screw occurs, and the motor position may not necessarily be the same value as the table 153, and in this case, it is necessary to correct the error. In addition, the speed is calculated in a speed calculator 104 based on the position FB value detected by the encoder 151, and the calculated speed is used as the speed feedback (speed FB). It should be noted that, in the case of the encoder 151 being able to detect the rotation speed, the detected speed may be usable as the speed feedback (speed FB).

The motor control device 100 includes a position detector (hereinafter referred to as "separate position detector 154") which is installed at an end of the ball screw 1523, separate from the encoder 151 detecting the rotation angle position of the motor 150, and detects the movement distance of the ball screw 1523. The output of the separate position detector 154 indicates the position of the table 153, and is used as the position feedback in full-closed control or control by only the separate position detector 154. In addition, the speed can be calculated by differentiating in the speed calculator 104 based on the position of the table 153 calculated by the separate position detector 154, and the calculated speed can be used as the speed feedback (speed FB) in the control by only the separate position detector. It should be noted that, in the case of reading the position of the table 153 directly by the separate position detector 154, and establishing as the position feedback (position FB), contrary to the case of establishing the signal detected by the encoder 151 as the position feedback (position FB) position, it is possible to detect highly reliable position feedback (position FB) information, without needing to correct for error due to backlash of gears in the connection mechanism 152, pitch error of the ball screw, and twist, stretch and thermal expansion of the ball screw existing between the motor 150 and table 153.

As shown in FIG. 1, the motor controller 110 includes a switching unit 111. The motor controller 110 establishes the position information of the table 153 detected by the separate position detector 154 as the position feedback (position FB) information, by connecting a position FB switching switch 121 to a contact 121a on the side of the separate position detector 154 by way of the switching unit 111. In addition, by connecting the position FB switching switch 121 to a contact 121b on the side of the encoder 151, it is possible to switch so as to establish the position information detected by the encoder 151 as the position feedback (position FB) information. More specifically, for example, in the case of the motor controller 110 establishing the position information of the table 153 detected by the separate position detector 154 as the position feedback (position FB) information, when detecting an abnormality in the separate position detector 154 or the feedback cable 1541 thereof, the switching unit 111 can switch so as to establish the position information detected by the encoder 151 as the position feedback (position FB) information, by connecting the position FB switching switch 121 to the contact 121b on the side of the encoder 151. Details of the switching process will be described later. In addition, the motor controller 110 establishes the speed information calculated based on the position information of the table 153 detected by the separate position detector 154 as the speed feedback (speed FB) information, by connecting the speed FB switching switch 122 to a contact 122a on the side of the separate position detector 154 by way of the switching unit 111. In addition, by connecting the speed FB switching switch 122 to the contact 122b on the side of the encoder 151, it is possible to switch so as to establish the speed information detected/calculated by the encoder 151 as the speed feedback (speed FB) information. More specifically, for example, in the case of the motor controller 110 establishing the speed information calculated based on the position information detected by the encoder 151 as the speed feedback (speed FB) information, when abnormality in the encoder 151 or the feedback cable 1511 thereof is detected, the switching unit 111 can switch so as to establish the speed information calculated based on the position information detected by the separate position detector 154 as the speed feedback (speed FB) information, by connecting the speed FB switching switch 122 to the contact 122a on the side of the separate position detector 154. Details of the switching process will be described later.

Prior to explaining the configuration for executing the switching process, the full-closed control, control by only the separate position detector and semi-closed control will be explained briefly. As shown in FIG. 1, the motor controller 110 includes a position subtracter 102, a position controller 103, a speed subtracter 105 and a speed controller 106.

Figure 2:
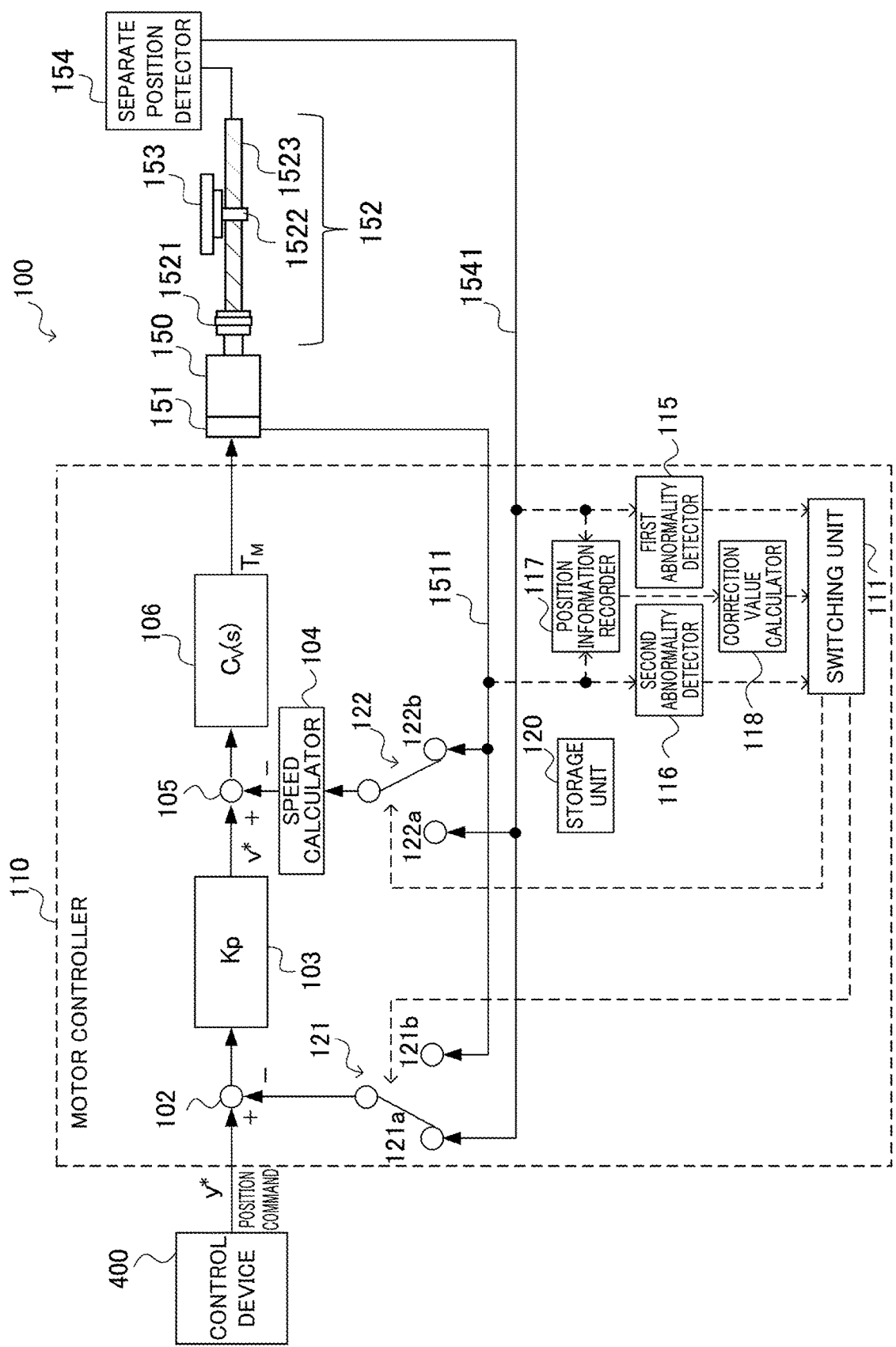
FIG. 2 is a view showing an outline in the case of the motor control device according to the present embodiment performing full-closed control.

First, the full-closed control will be explained. FIG. 2 shows an outline in the case of the motor control device 100 according to the present embodiment performing full-closed control. As shown in FIG. 2, the position FB switching switch 121 is connected to the contact 121a on the side of the separate position detector 154, and the speed FB switching switch 122 is connected to the contact 122b on the side of the encoder 151. The control device 400 sets a feed speed based on the machining program to create a position command value y*, and inputs the created position command value y* to the motor controller 110, so as to make the machined shape designated by the machining program. More specifically, the position command value y* is inputted to the position subtracter 102. The position subtracter 102 obtains the difference between the position command value y* and a machine position as the feedback position information which was position fed back by the separate position detector 154, and then outputs this difference as positional error to the position controller 103. The position controller 103, for example, outputs a value arrived at by multiplying a position gain Kp by the positional error to the speed subtracter 105 as the speed command value v*. The speed subtracter 105 obtains the difference between the speed command value v* and the motor speed as the speed feedback (speed FB) calculated in the speed calculator 104 based on the position FB value detected by the encoder 151, and outputs this difference to the speed controller 106 as the speed error. The speed controller 106, for example, performs the processing shown by the transfer function $C_v(s)$, and outputs a created torque command value $T_M$ to the motor 150 to drive the motor 150.

Figure 3:
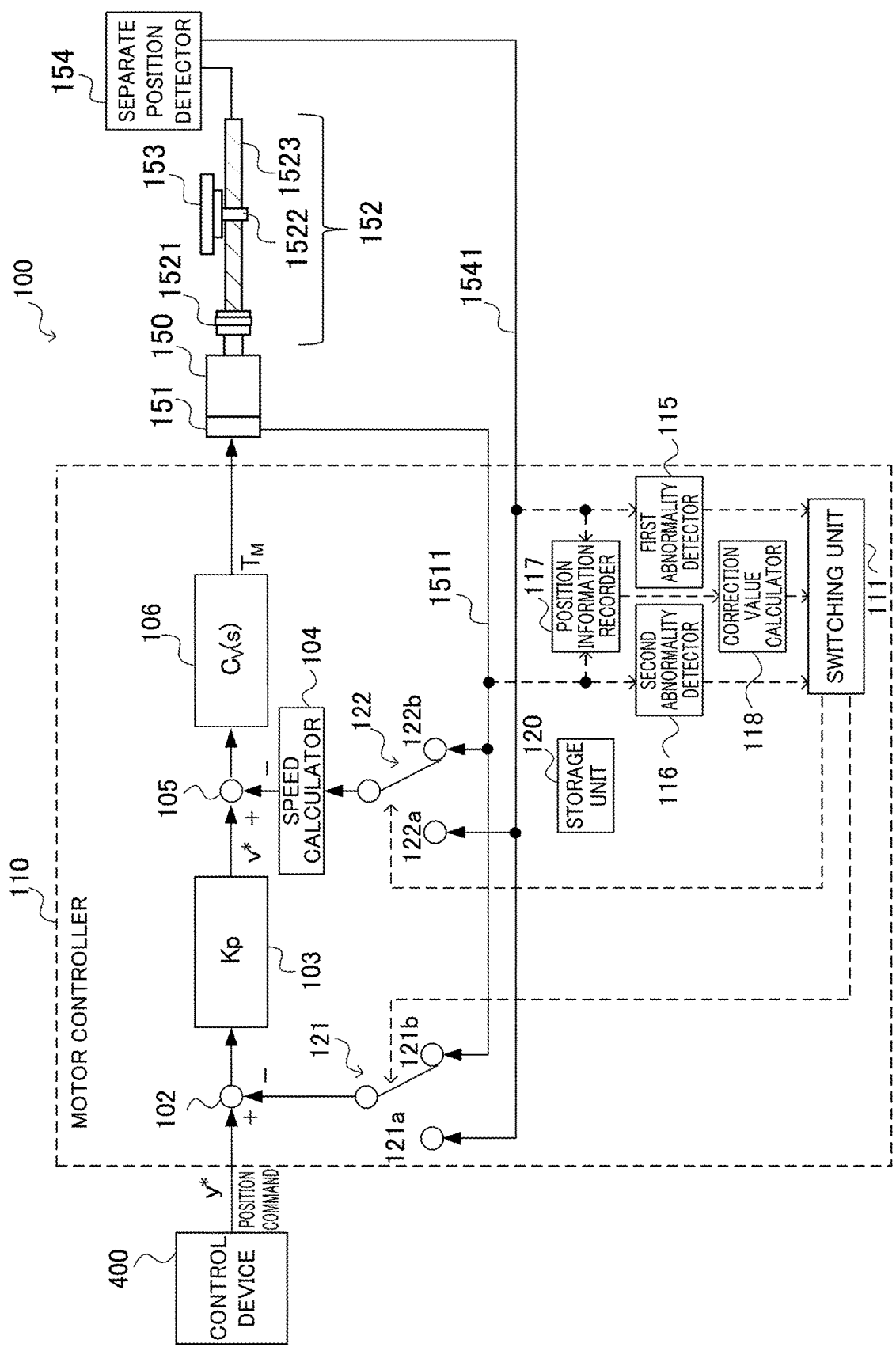
FIG. 3 is a view showing an outline in the case of the motor control device according to the present embodiment performing semi-closed control.

Next, a case of semi-closed control will be explained. FIG. 3 shows an outline in the case of the motor control device 100 according to the present embodiment performing semi-closed control. As shown in FIG. 3, in this case, the position FB switching switch 121 is connected to the contact 121b on the side of the encoder 151, and the speed FB switching switch 122 is connected to the contact 122b on the side of the encoder 151. The semi-closed control will be explained by replacing the wording of "feedback position information which was position fed back by the separate position detector 154" in the aforementioned explanation of the full-closed control with "feedback position information which was position fed back by the encoder 151".

Finally, a case of control by only the separate position detector will be explained. FIG. 4 shows an outline of a case of the motor control device 100 according to the present embodiment performing control only by the separate position detector. As shown in FIG. 4, the position FB switching switch 121 is connected to the contact 121a on the side of the separate position detector 154, and the position FB switching switch 122 is connected to the contact 122a on the side of the separate position detector 154. The control only by the separate position detector will be explained by replacing the wording of "speed feedback information calculated by the speed calculator 104 based on the position FB value detected by the encoder 151" in the aforementioned explanation of full-closed control with "speed feedback information which was speed fed back by the separate position detector 154".

Next, the configuration and processing for switching, in the case of abnormality arising in any of the separate position detector 154 or encoder 151, to feedback control based on a detector in which abnormality has not arisen will be explained. As shown in FIG. 1, the motor controller 110 includes a first abnormality detector 115, a second abnormality detector 116, a position information recorder 117 and a correction value calculator 118, in addition to the aforementioned switching unit 111. In addition, the motor controller 110 includes a storage unit 120.

The first abnormality detector 115 detects abnormality in the separate position detector 154 or the feedback cable 1541 thereof. More specifically, the first abnormality detector 115 determines and detects abnormality in the separate position detector 154 or the feedback cable 1541 thereof from interruption of a signal or position information such as an abnormality signal not being outputted from the separate position detector 154 by position detection inability, etc., or a defect arising in the separate position detector 154 and an abnormality signal such as a disconnect alarm not being outputted.

The second abnormality detector 116 detects abnormality in the encoder 151 or the feedback cable 1511 thereof. More specifically, the second abnormality detector 116 determines and detects abnormality in the encoder 151 or the feedback cable 1511 thereof from interruption of signals or position information such as an abnormality signal not being outputted from the encoder 151 under position detection inability, etc., or a defect arising in the encoder 151 and an abnormality signal such as a disconnect alarm not being outputted.

The position information recorder 117 updates and records position information during semi-closed control even during the full-closed control. More specifically, in the case of establishing the position information of the table 153 detected by the separate position detector 154 (hereinafter also referred to as "full-closed control position FB information") as the position feedback (position FB) information, and performing full-closed control, the position information detected by the encoder 151 simultaneously is acquired, and constantly updates and stores so as to be the latest information in the storage unit 120 along with the full-closed control position FB information. It should be noted that the position information recorder 117, in the case of establishing the position information of the table 153 detected by the separate position detector 154 (full-closed control position FB information) as the position feedback (position FB) information, and performing full-closed control, it may be configured so as to acquire the position information detected by the encoder 151 (semi-closed control position FB information), and update and store so as to make a value arrived at by subtracting the semi-closed control position FB information from the full-closed control position FB information (hereinafter also referred to as "position FB information difference") always the latest information in the storage unit 120.

As previously mentioned, the position FB switching switch 121 is connected to the contact 121a on the side of the separate position detector 154, and the speed FB switching switch 122 is connected to the contact 122b on the side of the encoder 151, during full-closed control. The switching unit 111, when an abnormality in the separate position detector 154 or the feedback cable 1541 thereof is detected by the first abnormality detector 115 during full-closed control, switches so as to input the position information detected by the encoder 151 as the position feedback (position FB) information to the position subtracter 102, in place of the position information of the table 153 detected by the separate position detector 154, by connecting the position FB switching switch 121 to the contact 121b on the side of the encoder 151. By configuring in this way, it is possible to rapidly transition from full-closed control to semi-closed control. It should be noted that, as previously mentioned, in the case of establishing the signal detected by the encoder 151 as the position feedback (position FB) information, contrary to the case of directly reading the position of the table 153 by the separate position detector 154 and establishing as the position feedback (position FB) information, error due to backlash of gears in the connection mechanism 152, pitch error of the ball screw, and twist, stretch and thermal expansion of the ball screw existing between the motor 150 and table 153 is present. For this reason, when changing the position feedback information from the position information of the table 153 detected by the separate position detector 154 to the position information detected by the encoder 151, there is a possibility of this error generating shock during feedback control. For this reason, when abnormality in the separate position detector 154 or feedback cable 1541 thereof is detected by the first abnormality detector 115, the correction value calculator 118 outputs, to the switching unit 111, a value correcting the position information detected by the encoder 151 immediately after switching based on the position FB information difference immediately before switching stored in the storage unit 120. The switching unit 111 establishes the correction value corrected by the correction value calculator 118 as the position feedback (position FB) information, and inputs to the position subtracter 102. By configuring in this way, it becomes possible to reduce the shock during switching to input the position information detected by the encoder 151 as the position feedback (position FB) information to the position subtracter 102, in place of the position information of the table 153 detected by the separate position detector 154.

In addition, in the case of detecting an abnormality in the encoder 151 or the feedback cable 1511 thereof by the second abnormality detector 116 during full-closed control, the switching unit 111 switches so as to input the speed information calculated based on the position information of the table 153 detected by the separate position detector 154 as the speed feedback (speed FB) information to the speed subtracter 105, by contacting the speed FB switching switch 122 to the contact 122a on the side of the separate position detector 154. It should be noted that there is no need for performing correction accompanying transition on the speed information.

In addition, the motor control device 100 also includes both configurations of full-closed control and semi-closed control, and can control both. For this reason, it may be configured so as to perform feedback control by the semi-closed control from the start, rather than full-closed control. In this case, when abnormality in the encoder 151 or the feedback cable 1511 thereof is detected by the second abnormality detector 116, the switching unit 111 can switch to control only by the separate position detector by connecting the position FB switching switch 121 to the contact 121a on the side of the separate position detector 154, and connecting the speed FB switching switch 122 to the contact 122a on the side of the separate position detector 154. It should be noted that the correction value calculator 118 may be configured so as to output, to the switching unit 111, a value correcting the position information of the table 153 detected by the separate position detector 154 immediately after switching with the position information detected by the encoder 151, based on the position FB information difference immediately before switching stored in the storage unit 120. The switching unit 111 can thereby input the correction value corrected by the correction value calculator 118 as the position feedback (position FB) information to the position subtracter 102. By configuring in this way, it becomes possible to reduce the shock during switching to input the position information of the table 153 detected by the separate position detector 154 as the position feedback (position FB) information to the position subtracter 102, in place of the position information detected by the encoder 151. In the case of abnormality in one detector arising, the motor controller 110 can switch to the feedback control based on the detector in which abnormality has not arisen, in this way.

Next, the processing after switching to feedback control based on the detector in which abnormality has not arisen, in the case of an abnormality in one detector arising, will be explained. As mentioned above, in the case of abnormality in one detector arising, the control device 400 can continue executing the machining program during execution also after switching, by switching to the feedback control based on the detector in which abnormality has not arisen. In addition, the motor controller 110 can be configured so as to stop the machining processing during execution after switching. More specifically, for example, the motor controller 110 (switching unit 111) may be configured so as to stop, by inputting, to the position subtracter 102, the position command for stopping the machine mobile part (table 153, etc.) by performing speed control with a decelerated speed control command of a predetermined pattern set in advance, in place of the position command from the control device 400. In addition, in the case of stopping after switching, the motor controller 110 (switching unit 111) may be configured so as switch to speed control and perform speed control by inputting, to the speed subtracter 105, the speed command decelerating in a predetermined pattern from the speed during switching so the speed becomes 0, in place of position control. In this case, the speed feedback can use speed feedback information detected by a detector in which abnormality has not arisen, e.g. a pulse coder. It should be noted that selection of stopping or continuing machining may be configured to be performed based on a parameter value set in advance.

Next, operation of the motor control device 100 (motor controller 110) will be explained. FIGS. 5A to 5D are flowcharts for explaining the flow of processing executed by the motor control device 100 (motor controller 110) in every position/speed loop processing cycle. It should be noted, herein, the processing flow will be explained in the case of continuously executing a machining program during execution by the control device 400 even after switching, by switching to feedback control based on the detector in which abnormality has not arisen in the motor control device 100, in the case of abnormality in one detector arising during full-closed control.

When referencing FIG. 5A, in Step S1, the first abnormality detector 115 detects the presence/absence of abnormality in the separate position detector 154 or the feedback cable 1541 thereof. In the case of not detecting abnormality, the processing advances to Step S2. In the case of detecting abnormality, the processing advances to Step S11.

In Step S2, the second abnormality detector 116 detects the presence/absence of abnormality in the encoder 151 or the feedback cable 1511 thereof. In the case of not detecting abnormality, the processing advances to Step S3. In the case of detecting abnormality, the processing advances to Step S21.

In Step S3, the motor controller 110 performs position control and speed control based on full-closed control in this processing cycle. In Step S4, the position information recorder 117 acquires the full-closed control position FB information, as well as the semi-closed control position FB information in this processing cycle, and updates and stores so as to always be the latest information in the storage unit 120, together with the full-closed control position FB information. Subsequently, in order to perform position/speed loop processing in the next cycle, the processing advances to Step S1. It should be noted that the sequence of Step S3 and Step S4 may be reversed. By configuring in this way, unless abnormality in the separate position detector 154 or the feedback cable 1541 thereof and in the encoder 151 or the feedback cable 1511 thereof is detected, the full-closed control is done, and processing of driving the motor 150 to move the table 153 is done every processing cycle.

Figure 5B:
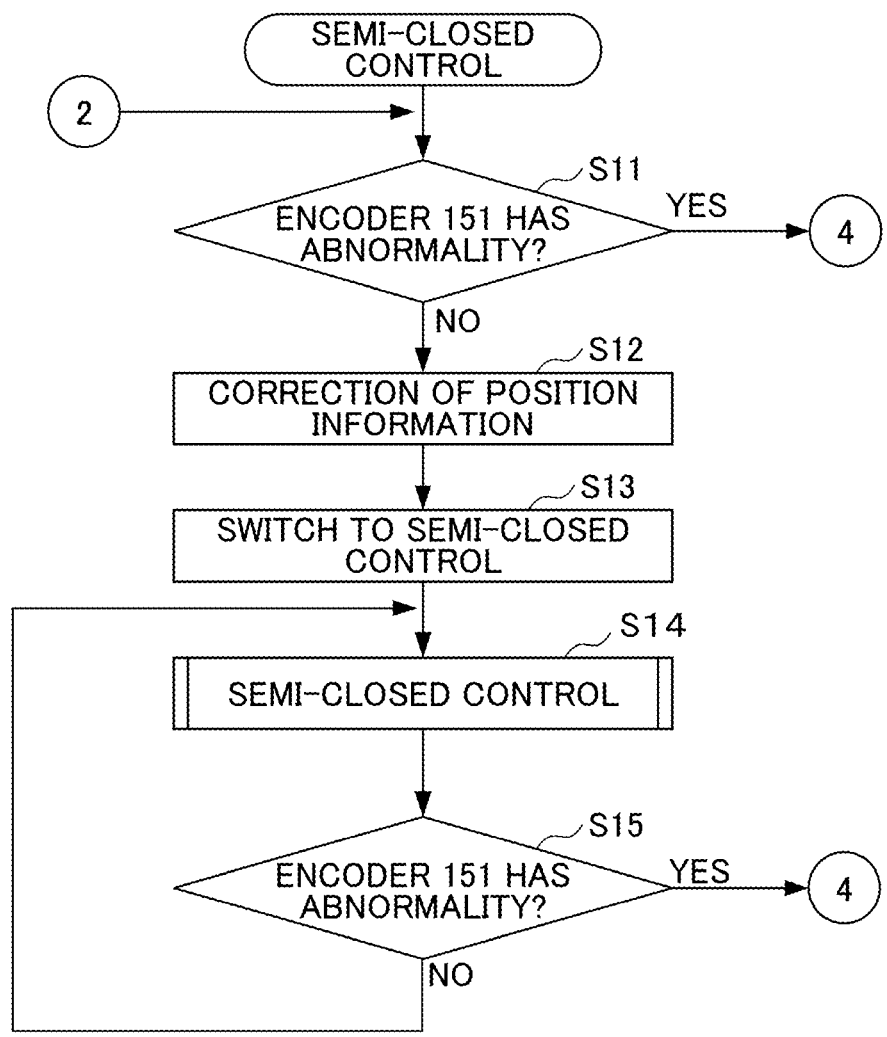
FIG. 5B is a flowchart for explaining a flow of processing executed by the motor control device according to the present embodiment every position/speed loop processing cycle.

Next, when referencing FIG. 5B, in Step S11, the second abnormality detector 116 detects the presence/absence of abnormality in the encoder 151 or the feedback cable 1511 thereof. In the case of not detecting abnormality, the processing advances to Step S12. In the case of detecting abnormality, the processing advances to Step S31.

In Step S12, in order to switch from the full-closed control to semi-closed control, the correction value calculator 118 calculates the difference between the full-closed control position FB information immediately before switching stored in the storage unit 120 and the semi-closed control position FB information as the correction value during switching.

In Step S13, the switching unit 111 switches from the full-closed control to semi-closed control, by connecting the position FB switching switch 121 to the contact 121*b* on the side of the encoder 151. On this occasion, in place of the position information of the table 153 detected by the separate position detector 154, the position feedback (position FB) information correcting the position information detected by the encoder 151 based on the correction value calculated in Step S12 is inputted to the position subtracter 102.

In Step S14, the motor controller 110 performs position control and speed control by semi-closed control in this processing cycle. Subsequently, the processing advances to Step S15.

In Step S15, the second abnormality detector 116 detects the presence/absence of abnormality in the encoder 151 or the feedback cable 1511 thereof. In the case of not detecting abnormality, the processing advances to Step S14. In the case of detecting abnormality, the processing advances to Step S31. By configuring in this way, by switching to feedback control based on the encoder 151 in which abnormality has not arisen, it is possible to continuously execute the machining program in execution by the control device 400 even after switching.

Next, when referencing FIG. 5C, in Step S21, in order to switch from full-closed control to control only by the separate position detector, the switching unit 111 inputs the speed information calculated based on the position information of the table 153 detected by the separate position detector 154 as the speed feedback (speed FB) information to the speed subtracter 105, by connecting the speed FB switching switch 122 to the contact 122*a* on the side of the separate position detector 154.

In Step S22, the motor controller 110 performs position control and speed control only by the separate position detector in this processing cycle. Subsequently, the processing advances to Step S23.

In Step S23, the first abnormality detector 115 detects the presence/absence of abnormality in the separate position detector 154 or in the feedback cable 1541 thereof. In the case of not detecting abnormality, the processing advances to Step S22. In the case of detecting abnormality, the processing advances to Step S31. By configuring in this way, by switching to speed feedback control based on the separate position detector 154 in which abnormality has not arisen, it is possible to continuously execute the machining program in execution by the control device 400 even after switching.

Figure 5D:
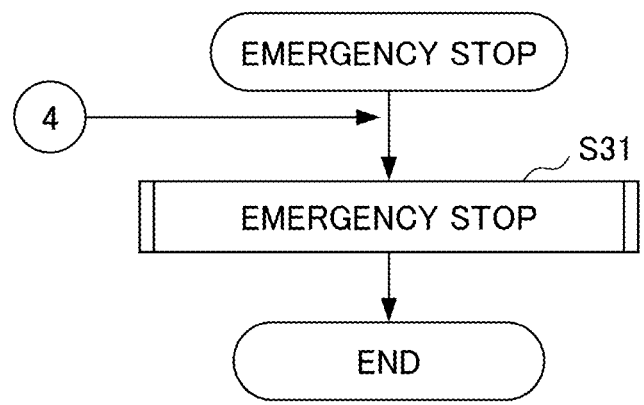
FIG. 5D is a flowchart for explaining a flow of processing executed by the motor control device according to the present embodiment every position/speed loop processing cycle.

Finally, when referencing FIG. 5D, in Step S31, due to abnormality in the separate position detector 154 or the feedback cable 1541 thereof and in the encoder 151 or the feedback cable 1511 thereof being detected, it is determined that the position/speed control loop is not operating normally, and the motor controller 110 cuts off power to the motor, for example, and connects a resistance between phases of the motor to emergency stop the motor 150 and machine by operating a dynamic brake. It should be noted that the above-mentioned processing flow is a processing flow in the case of continuously executing the machining program in execution by the control device 400 even after switching; however, it may execute processing so as to stop after switching, as mentioned above.

It should be noted that, as mentioned above, the motor control device 100 includes both configurations of full-closed control and semi-closed control, and can control by both. For this reason, from the start, it may be configured so as to apply and operate feedback control by the semi-closed control, rather than full-closed control. Even in this case, when abnormality arises in the encoder 151 or the feedback cable 1511 thereof, by switching to control only by the separate position detector, it is possible to continuously execute the machining process in execution by the control device 400 even after switching. The operating processing flow in this case will be briefly explained.

Initially, semi-closed control is executed, and every processing cycle of the semi-closed control, the second abnormality detector 116 detects the presence/absence of abnormality in the encoder 151 or the feedback cable 1511 thereof, and in the case of not detecting abnormality, performs semi-closed control, and in the case of detecting abnormality, switches to control only by the separate position detector.

After switching to control only by the separate position detector, the first abnormality detector 115 detects the presence/absence of abnormality in the separate position detector 154 or the feedback cable 1541 thereof every processing cycle, in the case of not detecting abnormality, performs control only by the separate position detector, and in the case of detecting abnormality, the motor controller 110 cuts off power to the motor, for example, and connects a resistance between phases of the motor, and emergency stop the motor 150 and machine by operating a dynamic brake. The above explained a processing flow of switching to the feedback control based on a detector in which abnormality has not arisen, in the motor control device 100 of the present embodiment, in the case of abnormality in one detector arising.

The motor controller 110 of the above-mentioned motor control device 100 is configured by a processor such as a CPU, memory such as ROM and RAM, an I/O circuit, etc., and each constituent element included in the motor controller 110 can be realized by this hardware, various software stored in the memory or a combination of these. Herein, realized by software indicates being realized by reading out various programs and executing by a processor such as a CPU.

The programs can be stored using various types of non-transitory computer readable media, and then supplied to a computer. The non-transitory computer readable media includes various types of tangible storage media. Examples of non-transitory computer readable media include magnetic media (for example, flexible disk, hard disk drive), magneto-optical recording media (for example, magneto-optical disk), CD-ROM (Read Only Memory), CD-R, CD-R/W, and semiconductor memory (for example, mask ROM, PROM (Programmable ROM), EPROM (Erasable PROM), flash ROM, RAM (random access memory)). In addition, the program may be supplied to the computer by way of various types of transitory computer readable media.

The aforementioned embodiment is a preferred embodiment of the present invention; however, it is not to limit the scope of the present invention to only the above embodiment, and implementation in modes arrived at by conducting various modifications in a range not departing from the gist of the present invention is possible.

Modified Example 1

In the aforementioned embodiment, the motor control device 100 is established as a different device than the control device 400; however, it is not limited thereto. For example, the motor control device 100 may be included in the control device 400.

Modified Example 2

In the aforementioned embodiment, the switching unit 111, first abnormality detector 115, second abnormality detector 116, position information recorder 117, and correction value calculator 118 are included in the motor controller 110; however, it is not limited thereto. For example, in the case of the motor controller 110 only driving the motor 150, it may be configured so that the switching unit 111, first abnormality detector 115, second abnormality detector 116, position information recorder 117, and correction value calculator 118 are included in the control device 400.

Modified Example 3

The aforementioned embodiment is configured so as to calculate the speed by the speed calculator 104 from the position information based on the rotational position (rotation amount) detected by the encoder 151, in the case of detecting the speed feedback (speed FB) information by the encoder 151, and use the calculated speed as the speed feedback (speed FB); however, it is not limited thereto. It may be configured so as to detect rotation speed of the motor 150, and use the detected speed as the speed feedback (speed FB).

Considering the above, the motor control device of the present disclosure can assume various kinds of modes having the configurations such as following.

(1) The motor control device 100 of the present disclosure includes the motor controller 110 which has: a first abnormality detector 115 which detects abnormality in a separate position detector 154 serving as a detector, or a feedback cable 1541 connected to the separate position detector 154; a second abnormality detector 116 which detects abnormality in a rotary encoder 151 of a motor serving as a detector, or a feedback cable 1511 connected to the rotary encoder 151; and a switching unit 111 which switches from full-closed control to semi-closed control or control only by the separate position detector, in which the switching unit 111, when detecting abnormality in any of the first abnormality detector 115 or the second abnormality detector 116, switches to control which uses only either of the detectors for which abnormality is not detected. According to this motor control device 100, in the case of abnormality in one detector arising, it is possible to switch to feedback control based on the detector in which abnormality has not arisen.

(2) The motor control device 100 as described in (1) may be configured so that the first abnormality detect 115 or second abnormality detector 116 detect and determine abnormality from interruption of a signal or position information. By configuring in this way, the motor control device 100 can detect abnormality in a detector or feedback cable thereof.

(3) The motor control device 100 as described in (1) or (2) may be configured so that the motor controller 110 further includes the correction value calculator 118 which calculates positional error based on position information detected by the rotary encoder 151 and position information detected by the separate position detector 154, in which the switching unit 111, when switching from full-closed control to semi-closed control, corrects position information detected by the rotary encoder 151, based on a correction value calculated by the correction value calculator 118. By configuring in this way, the motor control device 100 can correct difference in positions between full-closed control and semi-closed control of a backlash or twist amount, and can reduce or eliminate the shock during switching.

(4) The motor control device 100 as described in (3) may be configured so as to further include the storage unit 120, and the motor controller 110 further includes a position information recorder 117 which stores, in the storage unit 120, at least position information detected most recently by the rotary encoder 151, and position information detected most recently by the separate position detector 154, in which the correction value calculator 118 calculates positional error based on the position information stored in the storage unit 120. By configuring in this way, the motor control device 100 can calculate more precise positional error.

(5) The motor control device 100 as described in (3) may be configured so as to further include the storage unit 120, in which the correction value calculator 118 stores, in the storage unit 120, a correction value calculated based on position information detected most recently by the rotary encoder 151, and position information detected most recently by the separate position detector 154. By configuring in this way, the motor control device 100 can exert the same effects as (4).

EXPLANATION OF REFERENCE NUMERALS

10 control system
400 control device
100 motor control device
110 motor controller
102 position subtracter
103 position controller
104 speed calculator
105 speed subtracter
106 speed controller
111 switching unit
115 first abnormality detector
116 second abnormality detector
117 position information recorder
118 correction value calculator
120 storage unit
121 position FB switching switch
121a contact
121b contact
122 speed FB switching switch
122a contact
122b contact
150 motor
151 rotary encoder (encoder)
1511 feedback cable
152 connection mechanism
1521 coupling
1522 nut
1523 ball screw
153 table
154 separate position detector
1541 feedback cable

The invention claimed is:

1. A motor control device for controlling a motor of a machine tool, robot or industrial machine,
the motor control device comprising a controller,
wherein the controller includes:
a first abnormality detector which detects abnormality in a separate position detector serving as a detector, or a feedback cable connected to the separate position detector;
a second abnormality detector which detects abnormality in a rotary encoder of a motor serving as a detector, or a feedback cable connected to the rotary encoder; and
a switching unit which switches from full-closed control to semi-closed control or control only by the separate position detector,
wherein the switching unit, when detecting abnormality in any of the first abnormality detector or the second abnormality detector, switches to control which uses only either of the detectors for which abnormality is not detected.

2. The motor control device according to claim 1, wherein the first abnormality detector or the second abnormality detector detects and determines an abnormality from interruption of a signal or position information.

3. The motor control device according to claim 1, wherein the controller further includes:
a correction value calculator which calculates positional error based on position information detected by the rotary encoder, and position information detected by the separate position detector,
wherein the switching unit, when switching from full-closed control to semi-closed control, corrects position information detected by the rotary encoder, based on a correction value calculated by the correction value calculator.

4. The motor control device according to claim 3, further comprising a storage unit,
wherein the controller further includes:
a position information recorder which stores, in the storage unit, at least position information detected most recently by the rotary encoder, and position information detected most recently by the separate position detector, and
wherein the correction value calculator calculates positional error based on the position information stored in the storage unit.

5. The motor control device according to claim 3, further comprising a storage unit,
wherein the correction value calculator stores, in the storage unit, a correction value calculated based on position information detected most recently by the rotary encoder, and position information detected most recently by the separate position detector.

* * * * *